United States Patent [19]

Terayama et al.

[11] 3,998,846

[45] Dec. 21, 1976

[54] PROCESS FOR PREPARING DIBENZYLAMINO FLUORAN COMPOUNDS

[75] Inventors: Mutsuo Terayama; Kenji Yamamoto, both of Yao, Japan

[73] Assignee: Yamamoto Kagaku Gosei K.K., Oosaka, Japan

[22] Filed: Mar. 11, 1974

[21] Appl. No.: 450,167

Related U.S. Application Data

[62] Division of Ser. No. 123,069, March 10, 1971, Pat. No. 3,839,361.

[30] Foreign Application Priority Data

July 8, 1970  Japan .............................. 45-59711

[52] U.S. Cl. .............................. 260/335
[51] Int. Cl.$^2$ ...................... C07D 493/10
[58] Field of Search ..................... 260/335

[56] References Cited

UNITED STATES PATENTS

| 3,627,787 | 12/1971 | Lin | 117/36.2 |
| 3,681,390 | 8/1972 | Lin | 260/335 |

OTHER PUBLICATIONS

Billman et al., J. Am Chem. Soc., 65, 2455 (1943).
Billman et al., J. Am Chem. Soc., 66, 538–539 (1944).

*Primary Examiner*—R. J. Gallagher
*Attorney, Agent, or Firm*—Armstrong, Nikaido & Wegner

[57] ABSTRACT

New fluoran compounds containing a dibenzylamino group or a nuclear substituted derivative thereof are provided by a novel method involving the reaction of an aminofluoran and a benzyl chloride in the presence of alkali in an inert non-polar organic solvent. The dibenzylamino fluorans are incorporated as a remarkably effective color former in pressure sensitive copying paper.

4 Claims, No Drawings

PROCESS FOR PREPARING DIBENZYLAMINO FLUORAN COMPOUNDS

This is a division of application Ser. No. 123,069, filed Mar. 10, 1971, now U.S. Pat. No. 3,839,361.

BACKGROUND OF THE INVENTION

Fundamentally, pressure sensitive copying paper consists of two sheets of paper, the lower surface of the upper leaf having applied thereto minute capsules containing a color reactive achromatic substance (hereinafter called "a color former") dissolved in a low volatile solvent and the upper surface of the lower leaf being coated with a solid acid, such as acid clay, phenolic compounds, etc. When the lower surface of the upper leaf and the upper surface of the lower leaf are put together and pressure is applied to the upper surface of the upper leaf by handwriting or typing, the capsules under pressure are broken and the color former contained therein is absorbed by the solid acid on the upper surface of the lower leaf to develop a color, thus providing a copy. There is also a type of pressure sensitive copying paper having a mechanism to develop color when a regional pressure is exerted upon a sheet of paper holding capsules, which contain a color former, and a solid acid on or within it. However, such type is quite similar to the first mentioned pressure sensitive copying paper consisting of two sheets of paper, an upper and lower leaf with respect to the mechanism of color formation, and thus the same color former can be used for both types.

As the color former, various kinds of chemical compounds have been used, and, among others, the fluoran compounds have recently been occupying an important position in the pressure sensitive copying paper industry because of the rich variety of colors that such compounds develop and the high color-developing speeds. For example, 3,6-dimethoxy fluoran (Beilstein Hauptwerk Vol. XIX, p. 225) readily develops into yellow; 7-chloro-6-methyl-3-diethylamino fluoran (Japanese Pat. Publ'n. No. 21,199/1968) into yellowish red; rhodamine lactone (Beilstein Hauptwerk Vol. XIX, p. 344) into bluish red; and 3-diethylamino-7-methylamino fluoran (Canadian Pat. No. 814,948) into green-blackish green. Among the above-mentioned derivatives and homologues, many of them have become commercially available as dyes for pressure sensitive copying paper.

SUMMARY OF THE INVENTION

We have discovered new fluoran compounds containing a dibenzylamino group or its nuclear substituted derivatives represented by the following general formula I (this compound will, hereinafter, be referred to as dibenzylamino fluoran compound)

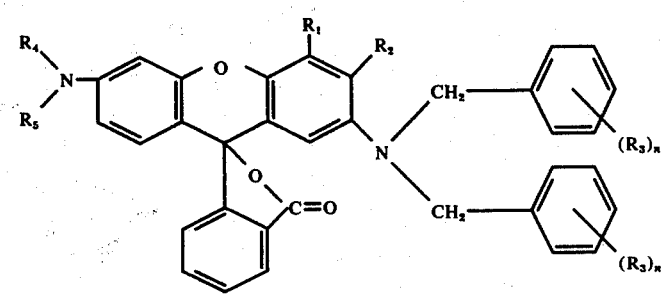

In the above formula $R_1$ and $R_2$ are individually hydrogen, halogen or methyl; $R_3$ is hydrogen, halogen or lower alkyl; $R_4$ and $R_5$ are individually methyl or ethyl; and $n$ is a integer from 1 to 5. $R_1$, $R_2$, $R_3$, $R_4$, and $R_5$ can be concurrently in any combination. In the case where $R_1$, $R_2$ or $R_3$ are halogen, chlorine and bromine are preferred. As a color former for pressure sensitive copying paper, the new fluoran compounds are outstanding in the significant requirements of color developing speed, developed color density, light resistance after color development and solubility thereof. In making the novel pressure sensitive copying paper, the compounds are dissolved in a low volatile solvent and packed in minute capsules which are used in conjunction with a solid acid.

DETAILED DESCRIPTION

Unfortunately, known manufacturing methods, when applied to the dialkylamino-dibenzylamino fluorans, are high in cost due to the low yield of end product and the intricacy of the process involved. For purposes of the invention, we have considered it important to eliminate this deficiency. For example, 3-diethylamino-7-dibenzylamino fluoran, among the compounds represented by the general formula (I), may be prepared by a conventional known method as follows:

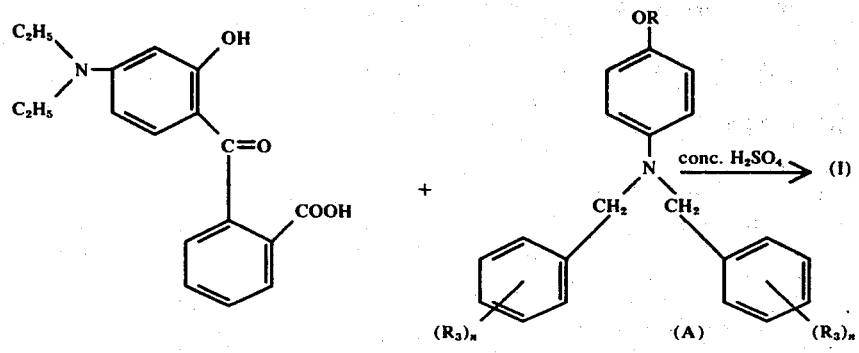

In the equation R represents hydrogen, methyl or ethyl, $R_1$, $R_2$, $R_3$ and $n$ are the same as defined in the general formula I. In this case the compound (A) must first be synthesized, i.e., by dibenzylation of the corresponding amino compound.

For the dibenzylation the following methods are known: (1) a reaction with benzyl chloride in alcohol (Beilstein Hauptwerk Vol. XIII, p. 450; (2) a reaction using sodium amide and benzyl chloride without solvent (D.R.P. 301832); and (3) a reaction with benzyl chloride in aqueous alkali solution (Beilstein 2nd Supplement Vol. XII, p. 554). However, these methods (1) to (3) are accompanied respectively by the following defects i.e. (1) a lowering of yield due to reaction by-products, (2) the intricacy of handling sodium amide and corresponding rise in cost, and (3) the intricacy of separation and purification of the reaction products. Thus, under the circumstances it is difficult to prepare dibenzylamino fluoran at low cost by these processes.

As a result of our continued study on the manufacturing process expressed by the following equation, we finally succeeded in developing a manufacturing process which is excellent from a practical industrial point of view, with none of the abovementioned defects.

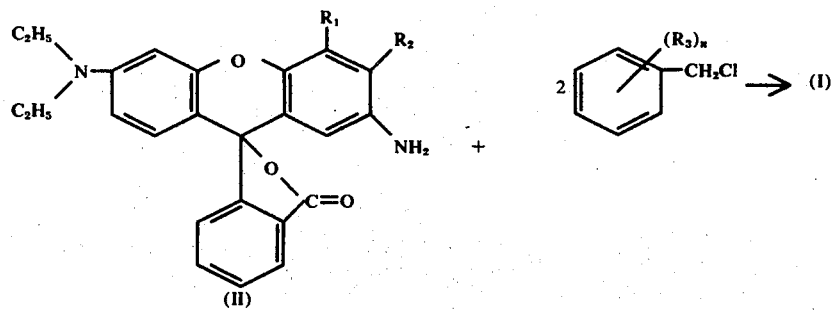

(In the above equation, $R_1$, $R_2$, and $R_3$ are the same as those defined in the general formula I).

A compound of the formula II (3-diethylamino-7-amino fluoran compound can be very easily manufactured in accordance with the following equation and the corresponding fluoran of the invention is made by benzylation of the compound II. In this case too, if the prior art benzylation process is used satisfactory results cannot be achieved with respect to yield, purity of the product, and the relative ease of manufacturing.

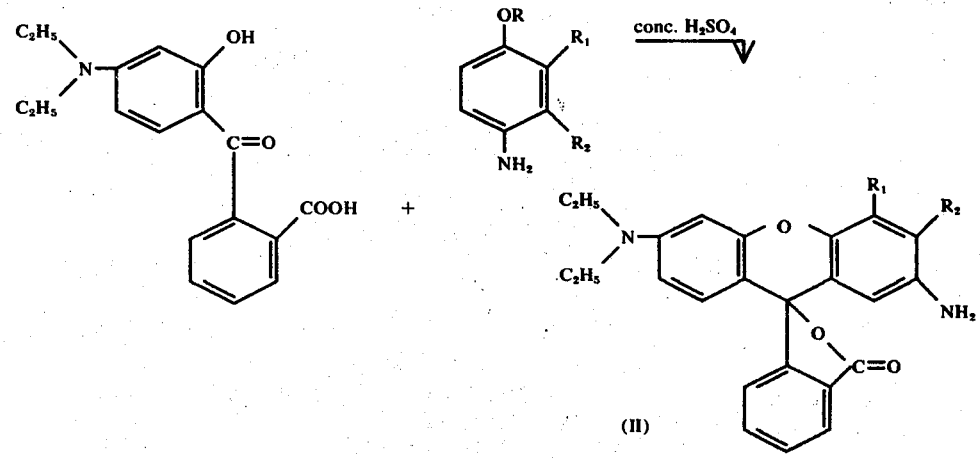

We found that the dibenzylamino fluoran compounds can be obtained in good yield by the reaction of aminofluoran compounds with a substantially stochiometric quantity of benzyl chloride in a non-polar aromatic solvent, and in addition, in the presence of solid alkali compounds. In this case, the use of solid alkali compounds makes the purification and separation of the reaction product exceedingly simple, so that a high purity product suitable for practical use will be obtained without any purification step, such as recrystallization.

As a non-polar solvent, aromatic solvents such as benzene, toluene and xylene are desirable. In contrast, highly polar solvents, such as alcohols and phenols, will hinder the separation and purification of the reaction products. However, solvents having a very weak polarity such as o-xylene and o-dichlorobenzene, are regarded as belonging to the class of non-polar solvents useful in the present invention.

The reaction temperatures and pressures are not critical, a wide range of temperatures can be used, but the reaction is preferably conducted at the reflux temperature of the aromatic solvent. The reaction can be conducted at atmospheric pressure or at superatmospheric pressures. Reduced pressures could be used, but such pressures result in unnecessary loss of solvent.

As the solid alkali compound potassium carbonate, sodium carbonate, caustic potash and caustic soda give the most favorable results. The alkali compound is used at least in an amount corresponding to the stoichiometric amount of aminofluoran compound or benzyl halide. The product is recovered from the reaction mixture by conventional means, for example by precipitation with a lower alcohol or by crystallization.

In the above explanation, although fluoran compounds having a diethylamino group as a substituent in 3-position has been described in the preparation of the benzyl substituted derivatives, those compounds having a dimethylamino group instead of the diethylamino group can be used in the same manner. And moreover, the introduction of substituent radicals into the fluoran nucleus of the aminofluoran will not adversely affect the process of the present invention provided that the substituent does not drastically lower the solubility of aminofluoran in the non-polar solvent.

Our invention is further illustrated by the following examples.

EXAMPLE 1

Preparation of 3-diethylamino-7-dibenzylamino fluoran (in I, $R_1=R_2=R_3=H$)

31.3g of 3-diethylamino-7-aminofluoran (in II, $R_1=R_2=H$), 50.7g of benzyl chloride, 40g of anhydrous potassium carbonate and 300 ml of toluene are stirred for 40 hours under reflux. After removing the solid portion by filtration, the filtrate is concentrated to 30 ml. Addition of 100 ml of methanol precipitated the product, which was collected by filtration, washed with a small quantity of methanol and dried.
White crystals
Yield: 47g (83% of theoretical value)
Melting Point 171°–173° C
Results of analysis: $C_{37}H_{34}N_2O_3$
Calculated: C: 80.56%; H: 6.01%; N: 4.95%. Found: C: 79.91%; H: 6.06%; N: 4.81%.

EXAMPLE 2

Preparation of 3-diethylamino-6-methyl-7-dibenzylamino fluoran (in I, $R_1=R_3=H$, $R_2=CH_3$)

4g of 3-diethylamino-6-methyl-7-aminofluoran (in II, $R_1=H$, $R_2=CH_3$). 6.3g of benzyl chloride, 4.14 g of anhydrous potassium carbonate and 40 ml of xylene are subjected to reaction in a manner similar to that of Example 1.
Light ochre crystals
Yield: 4.35 g (75% of theoretical value)
Melting point: 153°–154.5° C
Results of analysis: $C_{39}H_{36}N_2O_3$
Calculated: C: 80.69%; H: 6.21%; N: 4.83%. Found: C: 80.51%; H: 6.30%; N: 4.66%.

EXAMPLE 3

Preparation of 3-diethylamino-7-di(p-chlorobenzyl)aminofluoran (in I, $R_1=R_2=H$, $R_3=Cl$)

7.7 g of diethylamino-7-aminofluoran, 12.9g of p-chlorobenzyl chloride, 8.3 g of anhydrous sodium carbonate, and 80 ml of toluene are subjected to reaction in a manner similar to that of Example 1.
White crystals
Yield: 11.0g (82 % of theoretical value)
Melting point: 109°–110° C
Results of analysis: $C_{38}H_{32}N_2O_3Cl_2$
Calculated: C: 71.81%; H: 5.04%; N: 4.41%. Found: C: 74.08%; H: 5.08%; N: 4.53%.

EXAMPLE 4

Preparation of 3-diethylamino-5-methyl-7-dibenzylamino fluoran (in I, $R_1=CH_3$, $R_2=R_3=H$)

13 g of 3-diethylamino-5-methyl-7-aminofluoran (in II, $R_1=CH_3$, $R_2=H$). 16.5 g of benzyl chloride, 10g of anhydrous potassium carbonate and 100 ml of toluene are subjected to reaction in a manner similar to that of Example 1.
White crystals
Yield: 9.1 g (48.3 % of theoretical value)
Melting point: 173°–174° C
Results of analysis: $C_{39}H_{36}N_2O_3$
Calculated: C: 80.69%; H: 6.21%; N: 4.83%.
Found: C: 80.01%; H: 6.02%; N: 4.75%.

EXAMPLE 5

Preparation of 3-diethylamino-7-di(3'-methylbenzyl)amino fluoran (in I, $R_1=R_2=H$, $R_3=3'—CH_3$)

7.72 g of 3-diethylamino-7-amino-fluoran, 11.24 g of 3-methylbenzyl chloride, 8.2 g of anhydrous potassium carbonate and 100 ml of toluene are subjected to reaction in a manner similar to that of Example 1.
White crystals
Yield: 6.5 g (56% of theoretical value)
Melting point: 174°–177° C
Results of analysis: $C_{40}H_{88}N_2O_3$
Calculated: C: 80.81%; H: 6.40%; N: 4.71%. Found: C: 80.33%; H: 6.39%; N: 4.57%.

EXAMPLE 6

Preparation of 3-diethylamino-7-bis(2′, 4′-dimethylbenzyl) aminofluoran (in I, $R_1=R_2=H$, $R_3=CH_3$ in positions of 2′&4′)

7.72 g of 3-diethylamino-7-aminofluoran, 12.36 g of 2,4-dimethylbenzyl chloride, 8.28 g of anhydrous potassium carbonate and 80 ml of toluene are subjected to reaction in a manner similar to that of Example 1.
White crystals
Yield: 9.5 g (76.5 % of theoretical value)
Melting point: 225°–228° C
Results of analysis: $C_{42}H_{42}N_2O_3$
 Calculated: C: 81.03%; H: 6.75%; N: 4.56%. Found: C: 80.51%; H: 6.80%; N: 4.32%.

EXAMPLE 7

Preparation of 3-diethylamino-7-bis(2′,5,′-dimethylbenzyl)aminofluoran (in I, $R_1=R_2=H$, $R_3=CH_3$ in each position of 2′ & 5′)

7.72 of 3-diethylamino-7-aminofluoran, 12.36 g of 2,5-dimethylbenzyl chloride, 8.28 g of anhydrous potassium carbonate, and 80 ml of toluene are subjected to reaction in a manner similar to that of Example 1.
White crystals
Yield: 10.5 g (84 % of theoretical value)
Melting point: 214°–216° C
Results of analysis: $C_{42}H_{42}N_2O_3$
 Calculated: C: 81.03%; H: 6.75%; N: 4.50%.
 Found: C: 80.66%; H: 6.75%; N: 4.36%.

EXAMPLE 8

Preparation of 3-diethylamino-7-bis(mixed dimethylbenzyl) amino fluoran [in I, $R_1=R_2=H$, $R_3=CH_3$ (placed in two of any of the positions 2′, 3′, 4′, 5′ and 6′)]

7.72 g of 3-diethylamino-7-aminofluoran, 12.36g of mixed-dimethylbenzyl chloride (it is prepared by chloromethylating mixed xylene with formalin and hydrochloric acid), 8.28g of potassium carbonate anhydride and 80ml of toluene are subjected to reaction in a manner similar to that of Example 1.
White crystals
Yield: 8.5 g (68.5% of theoretical value)
Melting point: 225°–228° C
Results in analysis: $C_{42}H_{42}N_2O_3$
 Calculated: C: 81.03%; H: 6.75%; N: 4.50%.
 Found: C: 80.01%; H: 6.92%; N: 4.31%.

EXAMPLE 9

Preparation of 3-diethylamino-6-chloro-7-dibenzylaminofluoran (in I, $R_1=H$, $R_2=Cl$, $R_3=H$)

3.4g of 3-diethylamino-6-chloro-7-aminofluoran, 5.1g of benzyl chloride, 3.18g of anhydrons potassium carbonate and 40ml of toluene are subjected to reaction in a manner similar to that of Example 1.
Light orange colored white crystals
Yield: 1g (22.5% of theoretical value)
Melting point: 100°–105° C
Results of analysis: $C_{37}H_{33}N_2O_3Cl$
 Calculated: C: 75.94%; H: 5.50%; N: 4.66%.
 Found: C: 75.88%; H: 6.06%; N: 4.13%.

EXAMPLE 10

A pressure sensitive copying paper which uses 3-diethylamino7-bis(2′,5′-dimethylbenzyl)aminofluoran (which was obtained in Example 7), as its color former was prepared as follows:

60 g of gelatin and 60 g of gum arabic were dissolved in 50 ml of water at 40° C. Separately 6 g of 3-diethylamino-7-bis(2′, 5′-dimethylbenzyl)aminofluoran was dissolved in 150 g of diphenyl chloride. Then it was added to the aqueous solution of gelatin and gum arabic, and was completely dispersed and emulsified by means of a homo-mixer. To this dispersion was added water at 50° C to increase the volume of the dispersion to 2000 ml. Then 90 ml of 10 percent acetic acid, and water at 50° C was added with continuous stirring until the weight of the whole was increased to 4 kg. After an hour's stirring, the dispersion was cooled down to below 10° C with iced water under stirring, and 10 percent caustic soda was added to adjust its pH to 9. It was then gradually brought back to room temperature. It was applied to the lower surface of the upper leaf and dried.

Separately a solid acid, such as acid clay and phenolic compounds, was applied to the upper surface of the lower leaf.

When copying was effected with the pressure sensitive copying paper consisting of the upper and lower leaves thus prepared, it immediately developed a green image with an excellent light resistance.

EXAMPLE 11

A pressure sensitive copying paper which uses the color former obtained in Example 7 was prepared as follows:

By dissolving 4 g of 3-diethylamino-7-di(3′-methylbenzyl) aminofluoran in 120 g of diphenyl chloride and treating the resulting solution in the same manner as described in Example 10, an aqueous solution containing dispersed minute capsules was obtained. It was dried, by spraying, into a dust of minute capsules, which were then mixed and dispersed in a 4% xylene solution of a p-phenylphenol-formaldehyde condensation product. This dispersed solution was applied to a sheet of paper and dried to make a pressure sensitive copying paper. When a regional pressure was exerted on the coated paper, it immediately developed a green image having an excellent light resistance.

EXAMPLE 12

A pressure sensitive copying paper which uses the color former obtained in Example 7 was prepared as follows:

By dissolving 4 g of 3-diethylamino-7-bis(2′,4′-dimethylbenzyl) aminofluoran in 120 g of diphenyl chloride and treating the resulting solution in the same manner as described in Example 10, an aqueous solution containing dispersed minute capsules was obtained. This was mixed and dispersed with 8g of minute dust of p-phenylphenol-formaldehyde condensation product, and further admixed with 40 g of pulp. Then, after having been diluted with water so that the final solid contents was reduced to 0.5 per cent, it was passed over a net of a Fourdrinier to form a sheet of pressure sensitive copying paper. When a regional pressure was exerted on this sheet, it immediately developed a green image with an excellent light resistance.

In Examples 10, 11 and 12 the solvent of low volatility is diphenyl chloride. Substantially similar results are obtained if, in place of the diphenyl chloride, the solvent of low volatility is a lower alkyl diphenyl such as methyl-, ethyl-, and propyl diphenyl or a higher alkyl benzene, such as dodecyl- decyl- and octylbenzene, having a boiling point of above 150° C. If the boiling point of the solvent is at least 150° C it has sufficient low volatility according to the invention.

The solid acid functions as an electron acceptive adsorbent. In lieu of those used in the previous examples zeolite, bentonite, attapulgite and silton can be used with excellent results.

We claim:

1. A process for preparing a dibenzylaminofluoran compound of the formula:

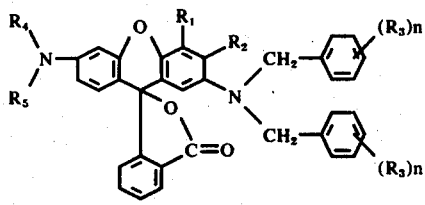

wherein $R_1$ and $R_2$ are individually members selected from the group consisting of hydrogen, chlorine, bromine, and methyl; $R_3$ is a member selected from the group consisting of hydrogen, chlorine, bromine, and $C_{1-4}$ lower alkyl; $R_4$ and $R_5$ are individually members selected from the group consisting of methyl and ethyl; and $n$ is an integer of from 1 to 5, comprising the step of reacting an amino fluoran compound of the formula:

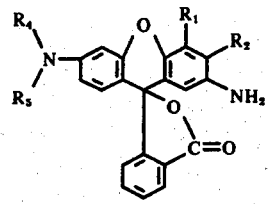

wherein $R_1$, $R_2$, $R_4$ and $R_5$ are as defined above, with a benzyl chloride of the formula:

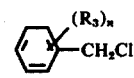

wherein $R_3$ and $n$ are as defined above, in a non-polar solvent and in the presence of a solid alkali selected from the group consisting of potassium carbonate, sodium carbonate, caustic potash and caustic soda.

2. A process according to the claim 1 wherein said non-polar solvent is an aromatic solvent selected from the group consisting of benzene, toluene and xylene.

3. The process of claim 1 wherein the solid alkali is potassium carbonate and the non-polar solvent is toluene.

4. The process of claim 1 wherein the solid alkali is potassium carbonate and the non-polar solvent is xylene.

* * * * *